UNITED STATES PATENT OFFICE.

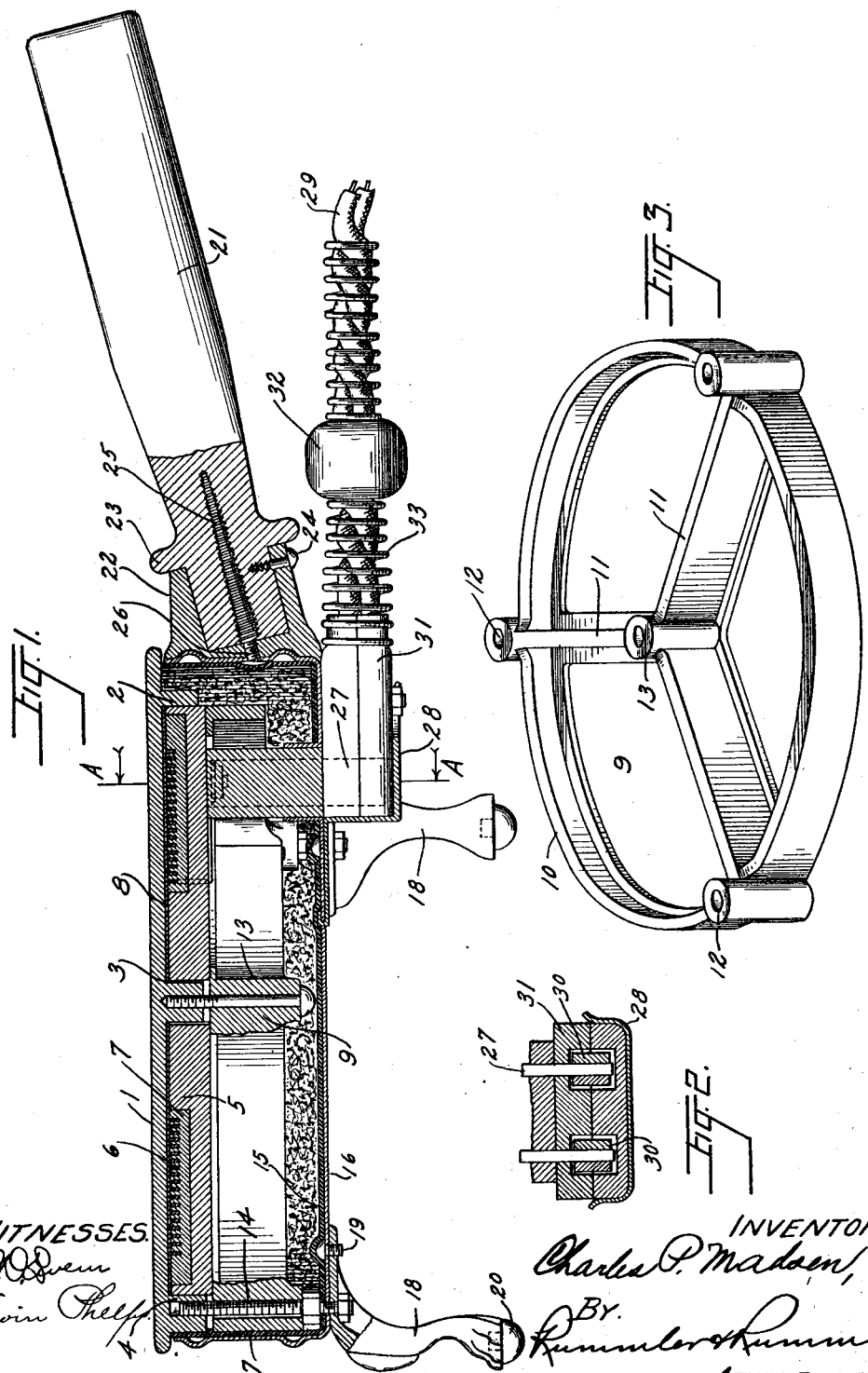

CHARLES P. MADSEN, OF CHICAGO, ILLINOIS, ASSIGNOR TO PELOUZE MANUFACTURING COMPANY, OF CHICAGO, ILLINOIS, A CORPORATION OF ILLINOIS.

DISK STOVE.

1,034,810. Specification of Letters Patent. Patented Aug. 6, 1912.

Continuation of application Serial No. 606,851, filed February 6, 1911. This application filed March 25, 1912. Serial No. 686,187.

*To all whom it may concern:*

Be it known that I, CHARLES P. MADSEN, a citizen of the United States of America, and a resident of Chicago, county of Cook, Illinois, have invented certain new and useful Improvements in Disk Stoves, of which the following is a specification.

The main objects of this invention are to provide an improved construction for electrically operated heating devices, whereby a higher efficiency, greater endurance and more rapid results may be obtained than is possible with usual constructions; to provide a construction which is particularly suitable for use in connection with electric stoves and related devices, in which the heat is applied by or transmitted from a plane surface; to provide an improved construction whereby the heat transmitting surface or heating plate may be comparatively thin and of low thermal capacity in proportion to the area of its heat transmitting surface, and may be at the same time rigidly reinforced so as to avoid the possibility of its becoming warped or bent so as to distort its heating surface out of a true plane as the result of changes of temperature, abrasion or accidental abuse, and which, by virtue of its thinness and low thermal capacity, can retain but little of the heat transmitted to it, and will therefore be capable of being rapidly brought up to proper operating temperature, and thereby avoid the usual initial waste of heat, while the heating plate is accumulating its temperature; to provide an improved form of truss structure for reinforcing the heating plate and electrical heating element; to provide an improved form of electrically heated disk stove and an improved method of attaching the handle thereto; and to provide an improved construction for switch blocks or plugs whereby the operator is compelled to withdraw the block from its socket in such manner as to break the circuit quickly and prevent the injurious sparking which sometimes occurs in devices of this kind when the circuit is broken gradually.

An illustrative embodiment of this invention is shown in the accompanying drawings, in which:—

Figure 1 is a vertical section of a disk stove constructed according to this invention. Fig. 2 is a fragmentary section taken on the line A—A of Fig. 1 and illustrating the arrangement of the switch contacts. Fig. 3 is a fragmentary view from the bottom of the reinforcing truss which gives rigidity to the thin top plate.

In the construction shown in the drawings, the heating plate or member, by means of which the heat is transmitted to vessels or other articles which are heated by the device, is a thin circular plate 1, having a plane polished upper surface, and is preferably an alloy of copper and tin which is of low thermal capacity so that it is incapable of storing much heat and does not require much heat to raise it to a high temperature, and is of such great conductivity that if a vessel has contact with it only on a small percentage of the surface, the greater part of the heat will be conducted to the points of contact through the material of the top plate rather than being radiated therefrom. Depending from the plate 1 and cast integral therewith, are a rim or flange 2, a central boss 3 and a plurality of outer bosses 4, the latter being located immediately outside of and merged into the flange 2.

The heating element comprises a flat plate or disk 5, of refractory insulating material, having embedded in its upper surface a coil of flat wire 6, preferably placed on edge and embedded in an insulating cement or enamel 7, which separates the convolutions of the coil and secures it to the disk 5. The upper surfaces of the coil lies in a true plane and is separated from the under surface of the top plate 1 by a thin sheet 8 of suitable insulating material, as for instance, mica. The bottom of the disk 5 is also preferably a plane surface, and the periphery is so shaped as to fit snugly within the flange 2 of the heating plate 1, there being also a perforation in the disk 5 to receive the middle boss 3. The construction of the heating element is more fully described and claimed in my copending application, Serial No. 454,355.

To obtain the best results from a disk stove or heater adapted to heat vessels or articles placed upon it, it is important that the top surface of such stove or heater be perfectly plane, so that it will have as large an area as possible in contact with the vessel, since if other conditions are equal, the quantity of heat transferred is proportional to the area of contact. Relatively speaking, stoves or disks of this type are large in diameter, and in order to provide sufficient strength for maintaining the top surface in one plane, the top plate has usually been made of cast iron thick enough to prevent distortion. This is seriously objectionable, for the reason that substances available for this purpose have a comparatively high specific heat co-efficient. For apparatus of this kind, this factor causes waste of heat by reason of the fact that while this plate is attaining the desired temperature, a rise of temperature also takes place to a more or less extent throughout the whole body of the device, and the energy thus stored is not available in practical operation. The refractory material of the heating element cannot be relied upon to give strength to the top plate, for the reason that it is likely to become cracked or warped under severe temperature changes, and if it were fastened to the top plate, it would necessitate still greater strength. In order to overcome these difficulties, and to reduce as much as possible the thermal capacity of the top plate, it is made as thin as possible, and the required stiffness is provided by means of a backing frame or truss 9, which is secured to the top plate in such manner as to brace it and also clamp the heating element against it. In the form shown, the truss 9 comprises a ring 10 having radially disposed spider arms or ribs 11 extending across the interior thereof and having bosses 12 and 13 located in positions registering with the bosses on the plate 1. The sectional area of the rim 10 and the ribs 11 is such as to give maximum strength with minimum amount of material, and to this end the horizontal breadth of said parts is comparatively narrow, whereas their depth is great. The upper surfaces of the ribs and ring lie in a true plane. Stud bolts extend through the bosses of the truss 9 and are tapped into the bosses in the top plate. The outer stud bolts 14 are threaded at their lower ends to receive nuts 15 and are extended below said nuts for attaching the bottom of the casing.

The casing of the stove is made up of the top plate 1 and a cup shaped shell 16, which incloses the heating element and its supporting truss. A layer 17 of insulating material, such as asbestos, is interposed between the sides of the casing 16 and the adjacent metal parts.

The stove is supported by means of legs 18 which are of cast metal, and which are held in place by the studs 14 and screws 19. The feet of the legs 18 are preferably provided on the bottom with buttons 20 of hard fiber.

The stove is provided with a single handle 21, preferably of wood or fiber, and this is secured to the casing of the stove by means of an escutcheon or socket member 22. The inner end of the handle is shaped to fit the circular socket in the member 22, and the handle is provided with an abrupt shoulder 23 which abuts against the rim of the socket in the member 22. The handle is retained in position by means of a screw 24 extending transversely into it and by a dowel screw 25 which extends axially into the handle and has its shank both threaded and riveted into the members 22 and 16. The long wood screw 25 and the shoulder 23 prevent the possibility of the handle becoming loosened through shrinking of the material thereof. The terminals of the coil 6 are connected to a pair of switch terminals 27 by projecting below the bottom of the casing and are suitably insulated from the latter. A shield or cover 28 is fastened to the bottom of the casing 16 and extends over the switch contacts 27. The conductors 29, by means of which the source of current is connected to the switch terminals 27, are provided with contact terminals 30 embedded in a block or plug 31 of insulating material which fits within the shield 28 and is recessed to permit the switch terminals 27 to engage the conductor terminals 30. The block 31 does not project far beyond the shield 28, and in order to withdraw it, the operator must grasp a button or handle 32 which loosely encircles the conductor cord and is connected with the switch block by means of a helical spring 33. Thus, to withdraw the plug, the operator pulls upon the button 32, stretches the spring 33, and as soon as the strain is sufficient, the plug 31 snaps sharply out of its socket and abruptly breaks the circuit, thus preventing arcing which occurs when the circuit is slowly broken.

The operation of the device shown is similar to that of other devices of this character and will therefore be readily understood from the foregoing description.

Although but one specific embodiment of this invention is herein shown and described, it will be understood that numerous details of the construction shown may be altered or omitted without departing from the spirit of this invention, as defined by the following claims.

I claim:—

1. An electric heating device comprising a thin plate, formed of material having low thermal capacity and having on its back a rearwardly disposed annular flange, and a series of outer bosses adjacent to said flange, a heating coil and insulating material in which said coil is embedded, said coil and insulating material being shaped to fit within said depending flange, a rigid frame behind said coil and insulating material and provided with screws engaging said bosses for clamping said coil and insulating material between said plate and frame, said frame comprising a ring having thereon a plurality of bosses corresponding in number and position to the bosses on said flange and having ribs or arms therein supporting a central boss, and screws connecting the bosses on said plate and frame.

2. In a device of the class described, a casing, a socket member on said casing and opening toward one side, a heating element within said casing and having terminals tending into said socket, and a conductor terminal member fitting within said socket and having therein contacts spaced to engage said contact members, a helical spring having one end connected to said plug and having thereon distant from said plug a handle adapted, when pulled by an operator, to stretch the spring and thereby cause sudden breaking of the circuit between said contacts and contact members.

3. In a disk stove, the combination of a thin, flat top plate, a rigid truss structure spaced away from said top plate, a heating element interposed between said top plate and said truss, a central screw extending through said truss and heating element and engaging said top plate, an annular series of screws extending through said truss adjacent to its edge and engaging said top plate, and means carried at the lower end of said screws and adapted to coact with said truss to brace both said top plate and heating element against distortion and maintain them in parallel relation throughout their contiguous areas.

Signed at Chicago this 19th day of March 1912.

CHARLES P. MADSEN.

Witnesses:
PHILIP B. WOODWORTH,
EDWIN PHELPS.

Copies of this patent may be obtained for five cents each, by addressing the "Commissioner of Patents, Washington, D. C."

It is hereby certified that in Letters Patent No. 1,034,810, granted August 6, 1912, upon the application of Charles P. Madsen, of Chicago, Illinois, for an improvement in "Disk Stoves," an error appears in the printed specification requiring correction as follows: Page 3, line 11, for the word "tending" read *extending;* and that the said Letters Patent should be read with this correction therein that the same may conform to the record of the case in the Patent Office.

Signed and sealed this 17th day of September, A. D., 1912.

[SEAL.]

C. C. BILLINGS,
*Acting Commissioner of Patents.*